United States Patent [19]

Houston et al.

[11] Patent Number: 4,802,542

[45] Date of Patent: Feb. 7, 1989

[54] POWERED WALKER

[75] Inventors: Thomas T. Houston, Erie; Raymond H. Metzger, Wheat Ridge, both of Colo.

[73] Assignee: Falcon Rehabilitation Products, Inc., Commerce City, Colo.

[21] Appl. No.: 899,890

[22] Filed: Aug. 25, 1986

[51] Int. Cl.⁴ ............. B60K 1/02; B60K 7/00; A61G 5/00

[52] U.S. Cl. .................... 180/65.5; 180/907; 280/304.1; 297/DIG. 4; 297/DIG. 10; 297/330; 5/81 R

[58] Field of Search ............ 180/65.1, 65.5, 907; 280/289 WC, 242 WC; 297/DIG. 4, 5, DIG. 10, 322, 330, 337; 272/70, 70.3, 70.4; 5/81 R

[56] References Cited

U.S. PATENT DOCUMENTS

| | | | |
|---|---|---|---|
| 3,872,945 | 3/1975 | Hickman | 180/907 |
| 3,955,639 | 5/1976 | Cragg | 180/907 |
| 3,964,786 | 6/1976 | Mashuda | 297/DIG. 10 |
| 4,053,025 | 10/1977 | Slusarenko | 180/15 |
| 4,054,319 | 10/1977 | Fogg | 297/DIG. 4 |
| 4,456,086 | 6/1984 | Wier | 180/907 |
| 4,555,121 | 11/1985 | Lockard | 280/289 WC |
| 4,614,246 | 9/1986 | Masse | 297/330 |

OTHER PUBLICATIONS

Levo from Amigo Los Angeles, Inc., "Rise to New Challenges".
Exercise and Standing Made Easy by Stand Aid of Iowa, Inc., "Standing with Class", Spring 1988.
The New Rehab Chair by Applied Scientific Knowledge, Inc.

Primary Examiner—David M. Mitchell
Assistant Examiner—Brian L. Johnson
Attorney, Agent, or Firm—Sheridan, Ross & McIntosh

[57] ABSTRACT

A powered walker apparatus includes a frame assembly defining a central space for containing an operator in a standing position. A mechanism is included for selectively moving the apparatus over a ground surface. A gate is provided for closing an entryway into the central space and is adapted to define the front surface of the apparatus when in a closed position. Finally, a seat assembly arrangement is provided having a seat member movable between a substantially horizontal position within the central space wherein the operator is maintained in a sitting position and a substantially vertical position wherein the operator is maintained in a standing position within such central space.

19 Claims, 5 Drawing Sheets

POWERED WALKER

BACKGROUND OF THE INVENTION

1. Field of the Invention

This invention relates to wheeled walker devices for assisting handicapped individuals to move about in an upright position and, more particularly, to powered walkers operable by the user or occupant thereof. Specifically, the present invention relates to a powered walker which is adapted to permit the occupant to transfer to the device in a sitting position and to rise to an upright position without lower body muscular effort on the part of the handicapped occupant.

2. Description of the Prior Art

Wheelchairs of various types and designs have been utilized for a considerable period of time for the purpose of transporting physically handicapped individuals having limited or no use of their legs, such as paraplegics and quadriplegics. Wheelchair designs have become quite sophisticated as a result of efforts intended to enable handicapped individuals to have a degree of control over their own movements. Thus, powered wheelchairs have incorporated a wide variety of control and safety devices to assist the handicapped operator thereof to achieve relatively independent movement and transportation. A major disadvantage with wheelchairs in general, however, is that such devices, while assisting handicapped individuals in moving about an area, restrict such individuals to a relatively rigid sitting position within the chair which causes continual pressure contact on the same areas of the body. This can lead to serious problems including skin and tissue degeneration, gangrene and the like.

Walker devices were designed to overcome some of the aforementioned problems relating to wheelchairs. It has been shown that devices which enable a handicapped individual to remain in a standing position for relatively long periods of time (2 or more hours), provide substantial advantages and benefits to handicapped individuals. More specifically, passive standing has been shown to produce beneficial physiological effects which include reduction of bone and calcium loss, reduction of hypercalciuria and urinary calculi, increased muscular tone and maintenance of range of motion, improved orthostatic circulatory regulation, and increased bladder pressure. In addition, substantial psychological benefits result from permitting physically handicapped individuals to remain in a standing position. Such standing positions provide increased independence and morale as well as permit the handicapped individual to position himself so as to be able to work at various working stations. Consequently, walker devices of various types have been developed to permit the handicapped individual to remain in a standing position for a period of at least several hours.

Walkers present a number of problems which are not encountered in wheelchair designs. Such problems arise in part from the fact that a user's body extends substantially above the center of gravity of the walker, thereby leading to the possibility of tipping over. If a walker is made with a relatively large base area to avoid the tipping problem, maneuverability of the walker is restricted. Additionally, it becomes more difficult to provide support for the user of the walker. Also, movement into a walker is much more difficult than transferring to a wheelchair since the user must not only transfer to the device, but must also achieve a standing position, and many users of such devices have no leg control or use whatsoever.

Early walker devices such as illustrated in U.S. Pat. No. 2,168,424 are useful although they have numerous problems and deficiencies. Most particularly is the fact that such early devices require the handicapped operator of the device to utilize his own muscular arm power to maneuver the device about a room or a ground surface area. Thus, the usefulness of the device was dependent entirely on the physical capability and strength of the user.

Powered walker devices were developed which overcame the aforementioned deficiency. Such power devices, as illustrated in U.S. Pat. No. 3,872,945, enable the user to stand within the walker and maneuver and move about an area utilizing a battery power pack or the like carried on the walker itself. This particular patent discloses such a device which enables the user to be highly maneuverable in an area.

Many power walker devices have a rear entryway and carry the power pack and other apparatus up front. These designs limit the distance which the operator of the walker may reach forwardly of the walker and thereby restrict usefulness when working at a table or other work space positioned in front of the walker. Thus, in such arrangements, an operator must position himself always to a work area in order to provide close proximity thereto. This sideways orientation to a work area presents certain problems in terms of comfort of and flexibility to the user. The device illustrated in U.S. Pat. No. 3,872,945 overcomes this problem and enables the user to be stationed within the walker apparatus very close to the front thereof, thereby enabling the user to reach beyond the walker a significant distance.

A major problem inherent with all of the aforementioned powered walker designs, including that of U.S. Pat. No. 3,872,945, is that an individual must be assisted into the walker. Moreover, once an individual is positioned within these walkers, they must remain in a standing position. If an individual positioned within the walker wishes to be placed in a seated position, the individual must be entirely removed from the walker. Thus, these designs limit overall usefulness of the walker. Accordingly, there remains a need for a powered walker apparatus which is easy for a handicapped individual to enter and exit unassisted and which enables an operator to move freely from a sitting to a standing position, again unassisted.

SUMMARY OF THE INVENTION

Accordingly, it is one object of the present invention to provide a powered walker device which enables the occupant thereof to freely and easily move from a sitting to a standing position therewithin without requiring leg muscle use or control.

It is another object of the present invention to provide a walking apparatus that is designed to enable the user thereof to easily transfer unassisted to the apparatus in a sitting position.

It is still another object of the present invention to provide a walking apparatus which is designed to allow the occupant thereof to readily change weight distribution therewithin and without assistance.

It is a further object of the present invention to provide a walking apparatus which is easily movable about a ground surface and will not tilt nor lose traction over uneven terrain.

Yet another object of the present invention is to provide a powered walker wherein an occupant may easily move to adjacent working areas of varying heights which remain within easy reach of the occupant.

To achieve the foregoing and other objects and in accordance with the purpose of the present invention, a powered walker apparatus is disclosed and is arranged to permit an operator to readily move between a fully seated position and a fully upright position therewithin. The apparatus includes a frame assembly having a base portion and spaced, vertical side portions projecting upwardly from the base portion to define a space therebetween for receiving an operator's body and to further define a front entryway to permit ingress and egress from this space by the operator. A foot support is affixed to the base portion to provide support for the operator when in an upright, standing position within the apparatus. A wheel mechanism is connected to the base portion for supporting the frame assembly above a ground surface for movement therealong. The wheel mechanism includes at least one powered wheel member for moving the apparatus over the ground surface. A power source provides power to the wheel mechanism, and a control device interconnects the power source and the wheel mechanism to permit the operator to control the movement of the wheel mechanism and to thereby control the movement of the apparatus along the ground surface.

A gate arrangement selectively extends across the entryway to provide a closure mechanism when the operator is in the apparatus. Finally, a seat assembly is provided for supporting an operator when in a seated position within the apparatus as well as supporting the operator when in an upright position. The seat assembly includes a seat member and a seat control mechanism for selectively moving the seat member between a substantially horizontal position for carrying the operator in a seated position within the apparatus and a substantially vertical position for supporting the operator when the operator is in an upright position within the apparatus.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in which:

DETAILED DESCRIPTION OF THE PREFERRED EMBODIMENTS

Figure 1:
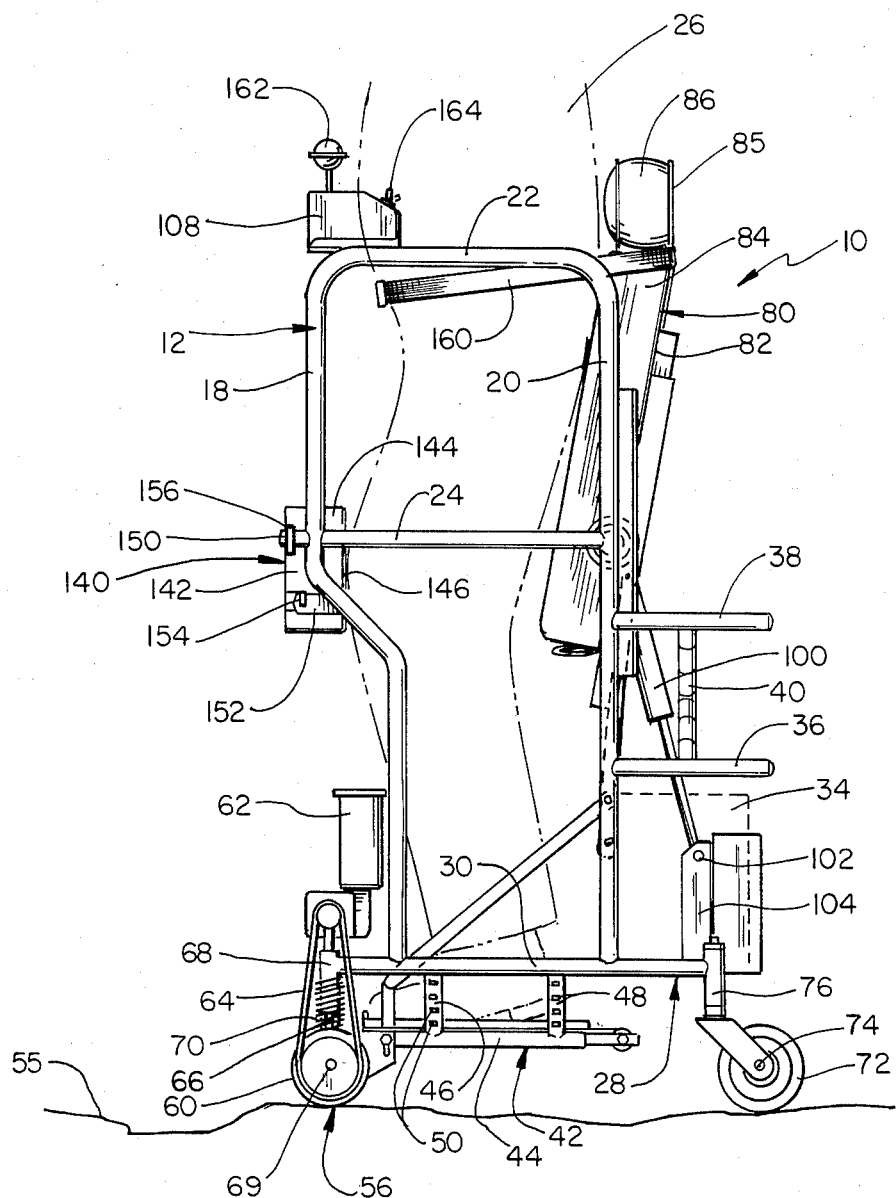
FIG. 1 is a side perspective view of the walker device of the present invention which illustrates an operator in shadow positioned therewithin in a fully upright position.
Figure 3:
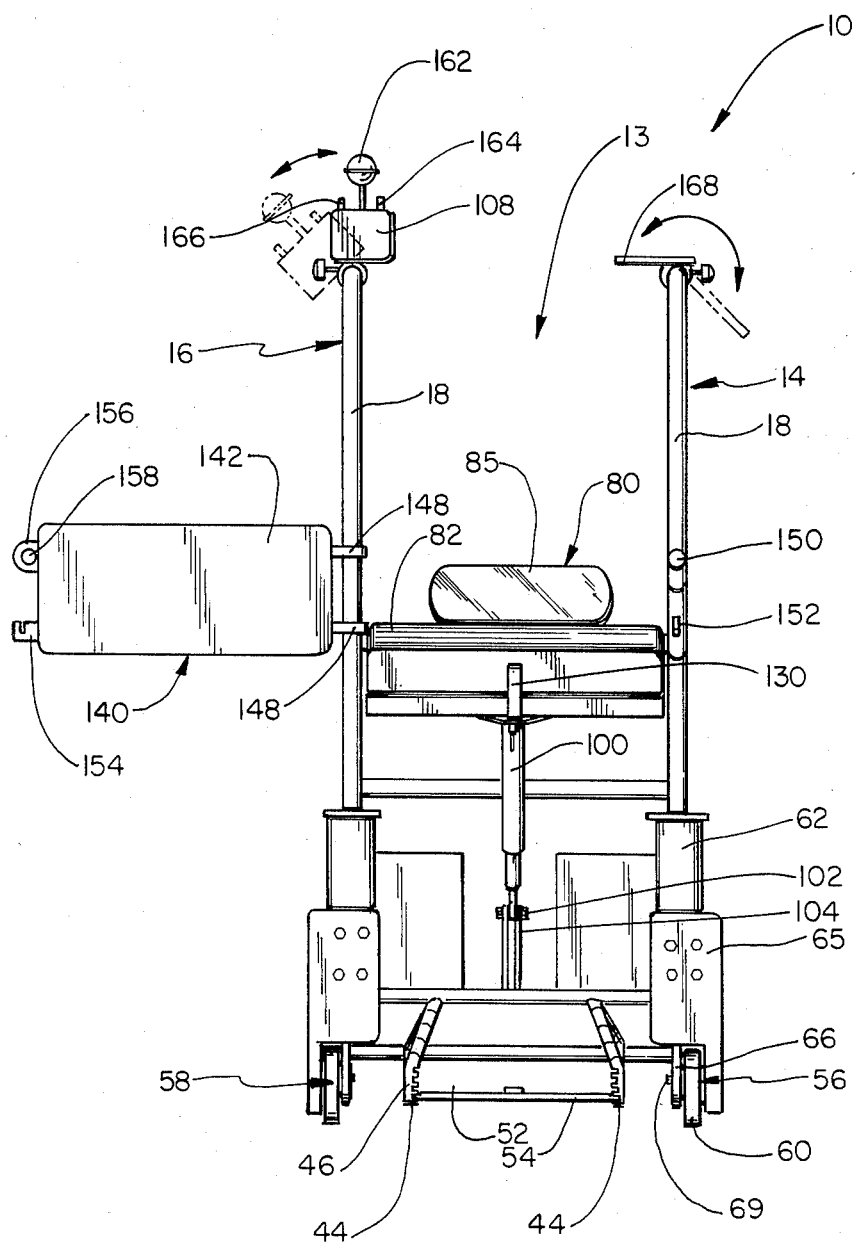
FIG. 3 is a front view of the embodiment illustrated in FIG. 2.
Figure 4:
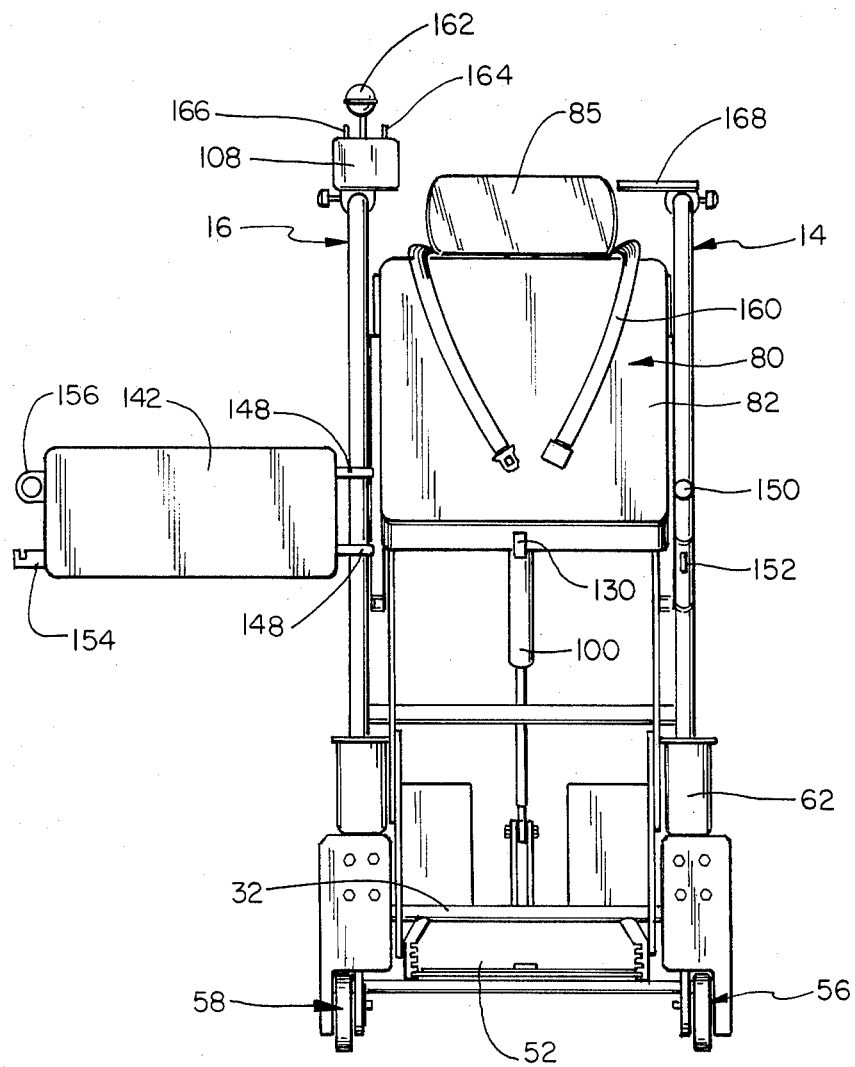
FIG. 4 is a front view of the embodiment illustrated in FIG. 1 with the gate mechanism thereof in a fully open position.

Referring initially to FIGS. 1 and 4, a motorized walker device 10 is illustrated. The walker 10 includes a frame assembly 12 having a left side portion 14 and a right side portion 16 defining a front entryway 13 (see FIG. 3). Each of the side portions 14, 16 includes vertical front and rear posts 18, 20, respectively, which are interconnected, as by welding, by vertically spaced-apart side rails 22, 24. The upper side rail 22 functions in part as an arm support member for an operator 26 positioned within the device 10.

A base 28 is provided for carrying the frame assembly 12 in a vertical, upwardly projecting manner therefrom. In preferred form, the base 28 includes a pair of side bar members 30 which are connected, as by welding, to the bottoms of the vertical posts 18, 20 of each side portion 14, 16. The side bars 30 are interconnected by a rear cross bar 32 to form a rectangular-shaped base assembly 28. The rear portion of the base assembly 28 is adapted to carry a power pack 34 which preferably is in the form a rechargable battery well known in the power wheelchair industry. Power pack 34 provides electric power to the various motor units of the device 10 as described in greater detail below. Projecting from the rear of the paired rear vertical posts 20 are a pair of generally U-shaped bumper posts 36, 38 interconnected by vertical support members 40. These posts 36, 38 are designed to protect the rear of the device 10 as well as the power pack 34 by projecting from the rear of the device 10. The rigid U-shaped bars 36, 38 also assist in structurally interconnecting the left vertical side portion 14 with the right vertical side portion 16 to provide unitary strength to the frame assembly 12, the terms "left" and "right" being relative to the orientation of an occupant positioned within the device 10. However, the U-shaped is also provided to permit easy movement of the seat assembly as described below.

Secured to the base assembly 28 and projecting downwardly therefrom is a foot support mechanism 42. In preferred form, the foot support mechanism 42 includes a pair of base of bottom bars 44 aligned beneath bars 30. Each of the bars 44 includes a pair of upwardly projecting posts 46, 48 secured thereto. Each of the posts 46, 48 are attached at their upper ends to the side bar members 30 and include a plurality of notches 50 which are aligned for receiving a foot tray 52 therein. The plurality of notches 50 are aligned along posts 46, 48 so as to provide a plurality of horizontal planar positions in which the foot tray 52 may be maintained relative to the assembly 42. The tray 52 is vertically adjustable along the posts 46, 48 in accordance with height and comfort of the operator 26.

Figure 2:
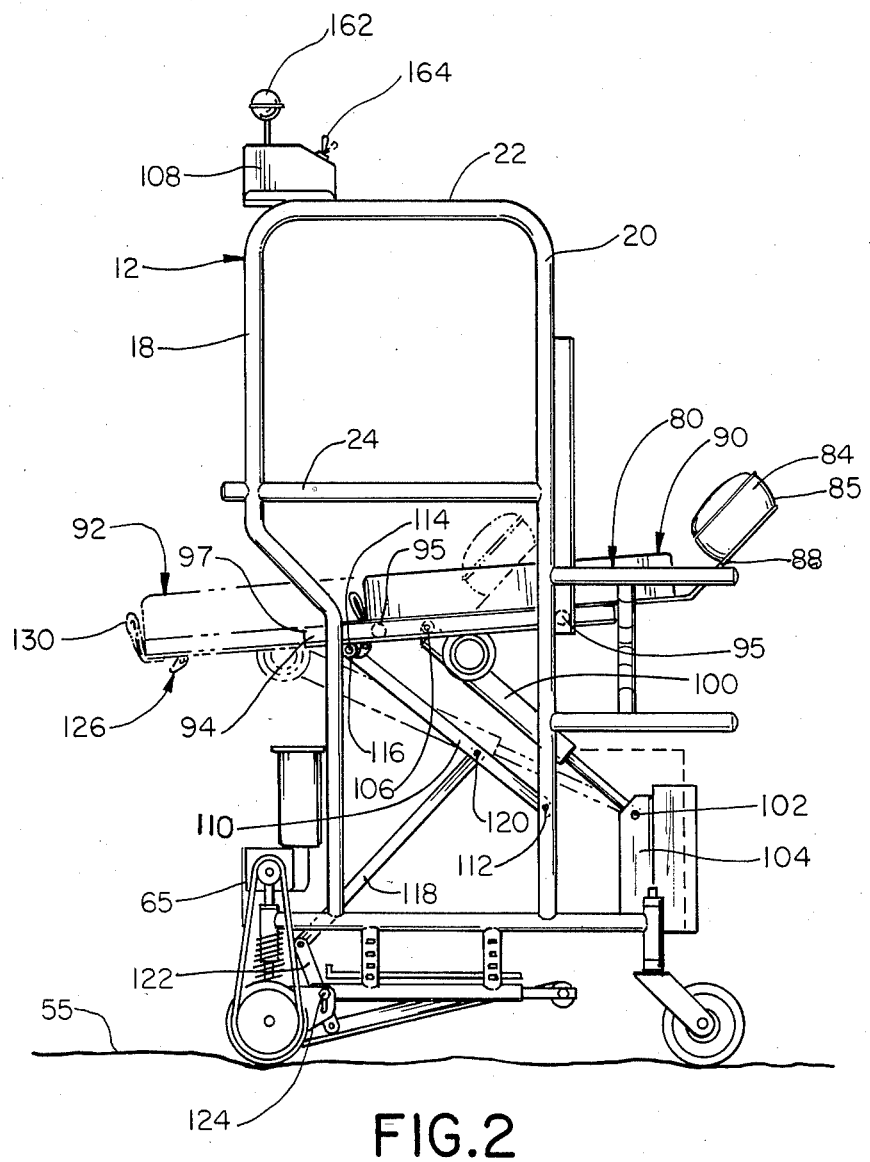
FIG. 2 is a side perspective view of the invention similar to FIG. 1 but illustrating the invention in a seated position.

In one form of the invention, the foot support assembly 42 is interconnected with the seat assembly as described in greater detail below such that when the seat assembly is placed into a horizontal sitting position, a front portion 54 of the foot support assembly 42 is lowered so as to contact the ground surface as illustrated in FIGS. 2 and 3. Thus, in this position, the foot support assembly 42 is inclined or sloped from the ground surface 55 to permit easier access by the user or operator as the operator enters the device 10. Moreover, the front portion 54 may be lowered so as to forcibly contact the ground surface 55 thereby removing some pressure from the front drive wheels as described below and thereby immobilizing or braking the device 10 as a user enters or exits therefrom.

A wheel mechanism is secured to the base portion 28 so as to permit movement and steering of the device 10 over the ground surface 55. In preferred form, a pair of independent drive wheels 56, 58 are positioned at the front end corners of the base assembly 28. Since each of the drive wheels 56, 58 is preferably identical in construction, only one such assembly will be so described. It is to be understood, however, that the description of one drive wheel 56 is applicable to the second drive wheel 58.

Referring particularly to FIG. 1, the drive wheel 56 includes a wheel member 60 interconnected to an electric motor 62. In the illustrated form of the invention, a drive chain or belt 64 is utilized to make this interconnection although other means such as direct drive linkage may be utilized. The motor 62 may comprise any available or appropriate drive mechanism and is preferably a standard wheelchair drive motor readily available in the market. The motor 62 moves the wheel 60 forwardly or rearwardly by appropriate rotation of the drive chain 64. A shroud 65 is provided to protect the mechanism of the wheel 56. The wheel 60 is interconnected to the base assembly 28 by a piston-like arrangement wherein the upper end of a connecting pin 66 is positioned for vertical movement within a receiving chamber 68 while connected at its lower end to wheel axle 69. A coiled spring 70 is disposed about the chamber 68 and pin 66 so as to bias or urge the pin 66 vertically outwardly from the chamber 68. However, due to the weight of the device 10, the pin 66 is normally maintained well within the chamber 68 and the spring 70 is maintained in compression. This arrangement remains in this condition so long as the ground surface 55 over which the device 10 is moving is flat. However, in the event that the ground surface 55 is uneven such that the wheel member 60 should come into contact with a dip or hole therein, the spring 70 automatically extends pin 66 so as to maintain the wheel 60 in continuous contact with the ground surface 55 despite the fact that the wheel 60 is in contact with an uneven surface. In preferred form, the amount of travel afforded to the pin 66 within the chamber 68 is approximately 2½ inches. Without this arrangement, if one wheel 56 should come into contact with a dip or hole, the wheel 56 could loose its traction with the ground surface 55 while wheel 58 continues to move, thereby causing the device 10 to unexpectedly tilt and/or turn.

A pair of freely rotating wheels 72 are attached to the rear portion of the base assembly 28. Each wheel 72 is mounted for free rotation about an axle 74 as well as mounted by a caster arrangement to a cylinder 76 so as to provide free pivotal movement therein. In this manner, support is provided to the rear of the device 10 to permit easy turning and movement thereof in response to the controlled drive movement of the front wheels 56, 58.

Referring now to FIGS. 1-5, the device 10 includes a seat assembly mechanism 80 which provides the present invention with many of its unique characteristics and capabilities. The seat assembly 80 includes a seat member 82 having a cushioned seat portion 84 disposed on the surface thereof. The cushion 84 may be any appropriate material for providing comfort to the user over a prolonged period of time. The seat member 82 is preferably substantially rectangular in shape and extends substantially the entire width of the device 10 between the vertical sides 14, 16. In addition, the seat member 82 includes an outwardly projecting lower back member 85 along the top portion thereof which is adapted for protecting and resting against the small of the back of the operator as illustrated particularly in FIG. 1. The lower back member 85 likewise has a cushion 86 thereon and is secured by a bracket 88 to the upper portion of the seat member 82. The lower back member 85 is adapted to move in conjunction with the movement of the seat member 82 as described below.

As previously indicated, the seat 82 is constructed so as to be able to move from a substantially horizontal position, as illustrated in FIGS. 2 and 3, to a substantially vertical or upright position as illustrated in FIGS. 1 and 4. By the term "substantially vertical or upright" it is preferably meant up to approximately 10 degrees short of true vertical relative to the horizontal plane of the base assembly 28. Moreover, the seat 82 is constructed so as to be able to move between a first horizontal position 90 located within the frame assembly 12 and a second horizontal position 92 wherein the seat 82 projects forwardly of the frame assembly 12.

Once the seat 82 is in position 92 so as to project forwardly through the entryway of the device 10, the seat 82 is readily accessible from in front of the device 10 so that a handicapped individual may easily transfer from a wheel chair or other device to the seat 82 without assistance and without undue effort. Once the individual is fully positioned on seat 82 in its second horizontal position 92, the seat 82 is then moved rearwardly to the position indicated at 90 so as to place the user in a seated position fully within the device 10. Then, as further described below, the occupant may secure certain portions of the device 10 to remain in a seated position or activate the seat 82 so as to move it to its substantially upright position as indicated in FIGS. 1 and 4.

Figure 5:
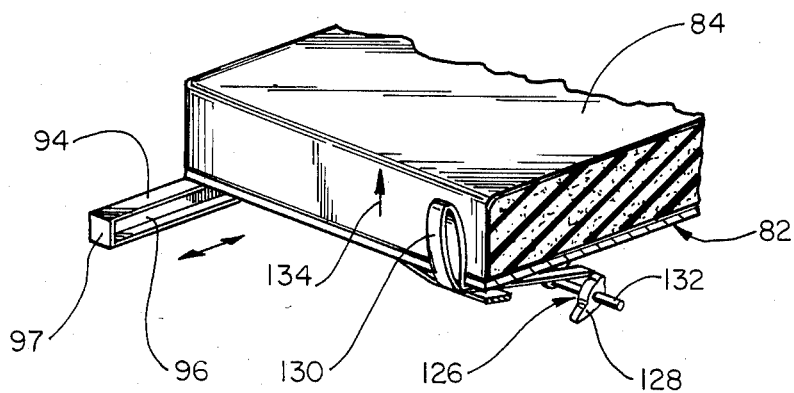
FIG. 5 is a perspective, partially sectional view of one seat construction of the present invention.

To achieve the above seat movements, and with specific reference to FIGS. 2 to 5, the seat 82 is mounted within a pair of slotted brackets 94. The brackets 94 are interconnected crosswise at several locations to form a stable frame structure to hold the seat 82 firmly therewithin. The seat member 82 includes a pair of pins 95 that travel within the groove 96 formed within brackets 94 so as to permit the seat 82 to selectively travel along the length of the brackets 94. Pins 95 limit the movement of the seat 82 relative to the brackets 94 as illustrated in FIGS. 2 and 5. When the pins 95 are at the forward ends 97 of the brackets 94, the seat 82 is in its forwardly extending position 92. Likewise, when the pins 95 are at the rearward portion of the brackets 94, the seat 82 is in its rearward horizontal position 90. Thus, movement of the pins 95 within the brackets 94 enables the seat 82 to move between the horizontal positions 90 and 92 as particularly illustrated in FIG. 2. It should be noted, however, that any seat movement arrangement may be utilized with the present invention so long as it enables the seat 82 to move between the indicated horizontal positions 90, 92.

To move the seat 82 between its two horizontal positions 90, 92, and its substantially vertical position as illustrated in FIGS. 1 and 4, a piston 100 is provided. The lowermost portion of one end of the piston 100 is pivotally connected at point 102 to a bracket 104 which is disposed at the rearward portion of the device 10 along the centerline thereof. The uppermost end of the piston 100 is pivotally connected at point 106 to the bottom portion of the seat 82. Extension and contraction of the piston 100 moves the seat 82 between its various horizontal positions 90, 92 and its vertical, upright position. Movement of the piston 100 is controlled by a control device 108 preferably mounted on the upper member 22 and operated by the user 26, as described in detail below. Power for operating the piston 100 is provided by the power-pack 34.

To assist in proper operation of the seat assembly 80, a pivot arm 101 is disposed on each side of the device 10. The bottom portions of each pivot arm 110 are pivotally mounted at point 112 to the rear vertical posts 20. The upper ends of pivot arms 110 are likewise pivotally mounted at point 114 to a single cross bar 116 which is secured beneath the forward portion of the brackets 94 (see FIG. 2). A second pair of pivot arms 118 are pivotally secured at one end 120 to the mid-portions of the arms 110 and are pivotally secured at their opposite ends to bottom brackets 122. The brackets 122 are in turn pivotally mounted at point 124 to the foot assembly 42. It is this connection from the seat assembly 80 with the brackets 124 that enables the forward portion of the foot assembly 42 to drop into contact with the ground surface 55 when the seat assembly 80 is moved to its horizontal positions 90, 92. This last aspect of the pivot arm connections, as previously indicated, is optional. In an alternate embodiment (not illustrated) the brackets 122 are eliminated and the brackets 118 connect directly to the assembly 42.

Referring in particular to FIGS. 2 and 5, a latch mechanism 126 is provided along the proximate centerline of the bottom portion of the seat 82. The latch mechanism 126 includes a hook arm 128 which is adapted for selective engagement with the cross bar 116. Likewise, a hand operable pull strap 130 is provided to rotate the hook arm 128 about its mounting bar 132. Thus, the latch assembly 126 is normally arranged so that the hook arm 128 is spring biased to engage the cross bar 116 if the seat 82 is moved from its horizontal position 90 toward its horizontal position 92. The engagement of the hook arm 128 with the cross bar 116 prevents movement of the seat 82 to its position 92. However, should the user desire so to move the seat 82 to its position 92, the strap 130 is pulled upwardly in the direction of arrow 134 to rotate the hook 128 out of engagement with the cross bar 116 and thereby allow the seat 82 to move forwardly to its second horizontal position 92. This interaction of the hook arm 128 with the bar 116 is essential to proper operation of the seat assembly 80.

Referring in particular to FIGS. 1 and 2, operation of seat assembly and movement of the seat 82 from its horizontal position 90 to either its second, forward horizontal position 92 or its vertical position occurs in the manner described below. Should the operator 26 desire to move the seat 82 from its position 90 to its vertically upright position, the piston assembly 100 is activated and extended. This extension of the piston 100 causes latch mechanism 126 to engage the cross bar 116. Since the latch mechanism 126 prevents further forward movement of the seat 82 beyond the bar 116, continued extension of the cylinder 100 forces the seat assembly 80 to lift along pivot points 114 and 106 so as to move the seat assembly 80 to its substantially vertically upright position as illustrated in FIG. 1. To lower the seat assembly 80 from its vertical position to the horizontal position 90, the cylinder assembly 100 is retracted until the seat 82 achieves its position 90.

Should the operator then wish to move the seat 82 from its horizontal position 90 to its second horizontal position 92 to permit entrance or exit from the device 10, the cylinder 100 is again extended. However, at this point the handle 130 is moved upwardly in the direction of arrow 134 so as to disengage the latch mechanism 126 from the cross bar 116. When this disengagement occurs, continued extension of the cylinder 100 will move the seat 82 along the brackets 94 until the seat 82 reaches its fully outwardly extended position 92. Once the latch mechanism 126 has passed over the cross bar 116, handle 130 may be released. To achieve movement of the seat 82 from position 92 to 90, the cylinder 100 is retracted. Since the hook arm 128 is curved as illustrated in FIGS. 2 and 5, movement of the seat 82 from its position 92 back to its first horizontal position 90 will automatically occur without using the strap 130. The curved portion of the hook arm 128 merely pushes across and over the cross bar 116, the spring bias arrangement permitting such rotation of the hook 128.

As soon as an individual 26 wishes to enter to the device 10, the seat assembly 80 is activated so as to move the seat to its outwardly projecting horizontal position 92. The operator of the device 10 then transfers onto the seat 82 and retracts the cylinder 100 so as to move the seat 82 to its first horizontal position 90. Once this position is achieved, the operator reverses operation of the cylinder 100 and extends the cylinder 100 until the latch mechanism 126 engages the cross bar 116, at which point the seat 82 moves to its upwardly standing position.

In order that the operator 26 may readily and firmly be maintained within the device 10, a gate mechanism 140 is provided. The gate mechanism 140 includes a gate member 142 having a thick foam padding 144 positioned thereon for engagement with the knees 146 of the operator 26 as indicated in FIG. 1. The gate member 142 is pivotally mounted by brackets 148 to one of the forward vertical posts 18. A ball member 150 and a latch member 152 are mounted on the opposite vertical post 18. Mounted on the free end of the gate 142 is a hook arm 154 for engagement with the latch 152 when the gate 142 is closed across the entryway 13, as clearly illustrated in FIG. 1 and FIG. 3. Likewise, disposed on the free end of gate 142 is a connecting member 156 having an aperture 158 therein which is sized and shaped to receive the ball 150. The ball 150 engages connecting member 156 to provide stability. Should the frame assembly 12 tend to become askew when moving over uneven ground, the connector 154 will not accidentally disengage the latch 152 and the gate 142 will remain closed due to the engagement between the ball 150 and the connector 156. This particular safety feature is important in that knees 146 of the user 26 will be firmly engaged against the inner surface of the gate 142 as illustrated in FIG. 1.

A safety strap or seat belt mechanism 160 is provided to encircle the operator 26. The seat belt 160 is secured to the seat 82 in any desired manner and is of a generally conventional seat belt design as, for example, frequently found in automobiles.

The control mechanism 108 may be of any desired type of mechanism capable of controlling power and operation of the cylinder 100 and the motors 62 for the driven wheels 56. In preferred form, control mechanism 108 includes a single toggle arm 162 which is utilized to control the direction of movement of the device 10. Two switches 164 and 166 are preferably provided. The switch 164 controls the high/low speed for the wheels 56, while the switch 166 will control the lift/drive mechanism for the seat assembly 80 by controlling extension or contraction of the cylinder 100. As illustrated in FIG. 3, the control mechanism 108 may be pivotally mounted to the cross arm 22 so that the control member 108 may be moved away from the operator 26 as desired. Moreover, the control member 108 can be moved to the opposite cross arm 22 depending on whether the operator wishes a left or right hand control. It should also be noted that the control mechanism 108 may comprise a chin control or blow control device in the case of a quadruplegic operator 26. Such devices are presently available in the market for use with power wheelchairs.

For convenience, a writing or utility tray 168 may be pivotally mounted on the opposite arm 22 from the control switch 108. The tray 168 is mounted so that it may be readily pivoted away as indicated in FIG. 3 as desired.

To summarize use and operation of the deivce 10, the seat 82 preferably projects at least approximately 50% of its depth outwardly beyond the frame assembly 12 when in its position 92. Moreover, the height of the seat 82 above the ground surface in its position 92 is generally approximately the same as a standard wheel chair or other chair height. Therefore, an operator or user 26 may readily transfer from a sitting position in some other device to the seat 82 in its horizontal position 92. At this point, the user 26 may preferably connect the seat belt mechanism 160 about the waist in order to securely and firmly position himself or the seat 82. It should be emphasized that most users or operators 26 will have absolutely no use or control of their leg muscles. Thus, the present invention is specifically designed and intended for use by such individuals without outside assistance. Once the seat belt mechanism 160 is so attached, toggle switch 166 is activated to retreat the cylinder 100 and move the seat 82 to its inner or first horizontal position 90. Once this position 90 is achieved, the gate 142 is closed so as to engage the connector 154 with the latch 152 and the ball 150 within the connector 156. The frame assembly 12 is sized and shaped so that the operator 26 may be in a fully sitting position with seat 82 in its position 90 and the gate mechanism 140 in either its closed or open position.

At this juncture, the operator 26 may then move himself to a standing position without utilizing or requiring any muscle control of his legs by engaging the switch 166 and extending the piston 100. As the piston 100 extends and the latch mechanism 126 engages the cross bar 116, the seat 82 gradually lifts upwardly to its substantially vertical position as indicated in FIGS. 1 and 4. In this maximum upright position, the seat 82 is preferably approximately 10 degrees off vertical. As the seat 82 moves from its horizontal position 92 to its upright position, the knees 146 of the operator 26 engage the inner soft surface of the gate 142. Thus, the contact points wherein the weight of the operator 26 is distributed and leveraged include primarily the operator's knees and buttocks/upper legs with some weight distributed to the feet. Once the operator 26 is in a fully upright position as indicated in FIG. 1, the weight of the operator 26 tends to firmly yet comfortably maintain and wedge the operator 26 in position between the gate 140 and the seat 82. In this position, the operator 26 may readily operate the high/low speed switch 164 as well as the toggle drive on 162 to easily move the walker 10 along the ground surface 55. Due to the independent drive arrangement of the wheels 56, the walker 10 is very mobile with a short turn radius.

In preferred form, the width of the walker device 10 in its outermost dimensions is approximately 2 feet. This enables the operator 26 to readily move through any standard door opening, which is quite unlike powered wheel chairs or other walker devices presently available. Moreover, not only will the operator 26 sustain the advantages of being in a standing position within the device 10 as described previous hereto, but the operator may readily shift his weight to a wide variety of relative positions between his feet, knees and buttocks/upper legs by moving the seat 82 to any desired position from its fully upright position and its fully horizontal position 90. Moreover, should the operator 26 wish to take a rest from standing, he may simply lower the seat 82 to its horizontal position 90 without having to open the gate mechanism 140 or otherwise alter the arrangement of the device 10. This continuous shifting of weight enables the user 26 to increase comfort as well as safety.

In operating the device 10 over a ground surface, the spring loaded independent action of the wheels 56 enables the walker device 10 to remain steady and in firm ground contact with the ground even when operated over an uneven surface. Moreover, since the weight of the device 10 is carried very low, the low center of gravity keeps the device 10 very stable even though its width dimension is small compared to prior art devices. Additionally, since the only portion of the device 10 immediately directly in front of the operator 26 is the gate mechanism 140, the operator 26 who is in a standing position within the device 10 may move immediately adjacent a work surface, which permits the operator 26 virtually a full arm extension across any work surface. This is unlike prior art devices which carry a great deal of equipment in the front portion of the walker. Such bulkiness in the front of prior art walkers severely limits the arm reach capability of the user of the walker.

Another distinct advantage of the design of the present invention is that since the gate mechanism 140 is the only item positioned between the operator 26 and the front of the device, and since this gate mechanism 140 is disposed very low relative to the operator 26 in a standing position, the operator is psychologically not part of the device 10. Thus, not only does the device 10 enhance access to a working surface, but it also increases the psychological fitness of the operator since he is not confronted with a bulky machine immediately in front of him which limits his access to a working surface. It should also be noted that, as previously described, since the weight distribution of the device 10 is low and to the rear, there is very little danger of the device 10 tipping forwardly even though there is very little in the way of machine immediately forward of the operator in an upright position within the device 10.

As can be seen from the above, the present invention provides a walker apparatus which permits an operator to easily move into and out of the powered walker without additional assistance. Moreover, the powered walker enables an operator with absolutely no leg muscle use or control to move between a fully seated and a fully upright position thereby permitting the operator to change relative weight distribution between his feet, knees, thighs and hips without assistance. This ability to change and shift weight distribution is both physically and psychologically beneficial to the operator and will enable the operator to remain within the motorized walker for extended periods of time. The device of the present invention enables the operator to move the device with good maneuverability in tight operating conditions as well as over uneven ground surface without loosing traction or stability thereof. In addition, the device of the present invention enables a single motor control for horizontal and vertical movement of the seat and permits the operator of the walker to operate the device utilizing a single control feature.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein, but may be modified within the scope of the appended claims.

We claim:

1. A powered walker apparatus arranged to permit an operator to readily move between a fully seated position and a fully upright position therewithin, said walker apparatus comprising:

frame assembly means having a base portion and spaced, vertical side portions projecting upwardly from said base portion to define a space therebetween for receiving an operator's body and to further define a front entryway to permit ingress to and egress from said space by said operator;

means affixed to said base portion to provide foot support for said operator when in an upright, standing position within said apparatus;

wheel means connected to said base portion for supporting said frame assembly means above a ground surface for movement therealong, said wheel means including at least one powered wheel member for moving said apparatus over said ground surface;

means for providing power to said wheel means;

means interconnecting said power means and said wheel means to permit said operator to control the movement of said wheel means and to thereby control the movement of said apparatus along said ground surface;

gate means adapted to selectively extend across said entryway to provide a closure mechanism when said operator is in said apparatus;

seat assembly means for supporting an operator when in a seated position within said apparatus as well as supporting said operator when in said upright position, said seat assembly means including a seat member and seat control means for selectively moving said seat member between a substantially horizontal position for carrying said operator in said seated position within said apparatus and a substantially vertical position for supporting said operator when said operator is in said upright position within said apparatus; and said seat control means including a seat control arm assembly for moving said seat member between a first rearward horizontal position disposed substantially entirely within the space defined by said vertical side portions and a second forward horizontal position wherein said seat member projects substantially outwardly through said front entryway to permit an operator easy access to said seat member exterior to said apparatus for transfer thereto or therefrom, the movement of said seat member from said second to said first horizontal position placing the operator fully within said apparatus.

2. The apparatus as claimed in claim 1, wherein said seat control means further includes a latch mechanism to selectively permit movement of said seat member from said first to said second horizontal positions.

3. The apparatus as claimed in claim 1, wherein said seat control means includes a single drive assembly for moving said seat member within a horizontal plane between said first and second horizontal positions as well as for moving said seat member from said first horizontal position to said substantially vertical position.

4. A powered walker apparatus arranged to permit an operator to readily move between a fully seated position and a fully upright position therewithin, said walker apparatus comprising:

frame assembly means having a base portion and spaced, vertical side portions projecting upwardly from said base portion to define a space therebetween for receiving an operator's body and to further define a front entryway to permit ingress to and egress from said space by said operator;

means affixed to said base portion to provide foot support for said operator when in an upright, standing position within said apparatus;

wheel means connected to said base portion for supporting said frame assembly means above a ground surface for movement therealong, said wheel means including at least one powered wheel member for moving said apparatus over said ground surface;

means for providing power to said wheel means;

means interconnecting said power means and said wheel means to permit said operator to control the movement of said wheel means and to thereby control the movement of said apparatus along said ground surface;

gate means adapted to selectively extend across said entryway to provide a closure mechanism when said operator is in said apparatus; and seat assembly means for supporting an operator when in a seated position within said apparatus as well as supporting said operator when in said upright position, said seat assembly means including a seat member and seat control means for selectively moving said seat member between a substantially horizontal position for carrying said operator in said seated position within said apparatus and a substantially vertical position for supporting said operator when said operator is in said upright position within said apparatus; wherein said gate means provides a front contact and support portion for the legs of said operator when in said upright position, and wherein said seat control means is adapted to move said seat member between first and second positions disposed in said horizontal plane and a third substantially vertical position, said second horizontal position projecting forwardly outwardly of said frame assembly means and said first position being disposed within said space defined by said vertical side portions and said gate means.

5. The apparatus as claimed in claim 4, wherein said seat control means includes a single control motor adapted to move said seat member between said first, second and third positions.

6. The apparatus as claimed in claim 4, wherein said third, substantially vertical seat position is aligned approximately 10 degrees from the vertical axis of said apparatus, said seat member being arranged to permit leverage of said operator's buttocks against the seat member in conjunction with leverage of said operator's knees against said gate means to maintain a first and comfortable wedging position within said apparatus without requiring any support or control from the legs of said operator.

7. The apparatus as claimed in claim 4, wherein said gate means comprises a single gate member pivotally secured to one said vertical side portion and releasably attachable to the opposite vertical side portion to permit selective closing of said entryway when an operator is disposed on said seat member in said first horizontal position.

8. A powered walker apparatus arranged to permit an operator to readily move between a fully seated position and a fully upright position therewithin, said walker apparatus comprising:
   frame assembly means having a base portion and spaced, vertical side portions projecting upwardly from said base portion to define a space therebetween for receiving an operator's body and to further define a front entryway to permit ingress to and egress from said space by said operator;
   means affixed to said base portion to provide foot support for said operator when in an upright, standing position within said apparatus;
   wheel means connected to said base portion for supporting said frame assembly means above a ground surface for movement therealong, said wheel means including at least one powered wheel member for moving said apparatus over said ground surface;
   means for providing power to said wheel means, wherein each said powered wheel member is independently powered for rotational movement and further includes spring means loaded in a vertical plane to provide vertical travel to said wheel member to maintain said wheel member in contact with said ground surface when said walker apparatus is moved over uneven terrain;
   means interconnecting said power means and said wheel means to permit said operator to control the movement of said wheel means and to thereby control the movement of said apparatus along said ground surface;
   gate means adapted to selectively extend across said entryway to provide a closure mechanism when said operator is in said apparatus; and
   seat assembly means for supporting an operator when in a seated position within said apparatus as well as supporting said operator when in said upright position, said seat assembly means including a seat member and seat control means for selectively moving said seat member between a substantially horizontal position for carrying said operator in said seated position within said apparatus and a substantially vertical position for supporting said operator when said operator is in said upright position within said apparatus.

9. The apparatus as claimed in claim 8, wherein said wheel means comprises two said independently powered wheel members.

10. The apparatus as claimed in claim 9, wherein said two powered wheel members are disposed along the forward portion of said apparatus, and wherein said wheel means further includes a pair of freely pivoting rear wheel members adapted for free pivotal and rotational movement in response to the movement of said apparatus caused by operation of said front powered wheel members.

11. The apparatus as claimed in claim 10, wherein said front powered wheel members are adapted for selective forward and rearward movement and are operated independently to provide the turning capability of said apparatus.

12. The apparatus as claimed in claim 11, wherein the rotation of said front powered wheel members is controlled by a single control member operable by said operator.

13. A powered walker apparatus arranged to permit an operator to readily move between a fully seated position and a fully upright position therewithin, said walker apparatus comprising:
   frame assembly means having a base portion and spaced, vertical side portions projecting upwardly from said base portion to define a space therebetween for receiving an operator's body and to further define a front entryway to permit ingress to and egress from said space by said operator;
   means affixed to said base portion to provide foot support for said operator when in an upright, standing position within said apparatus;
   wheel means connected to said base portion for supporting said frame assembly means above a ground surface for movement therealong, said wheel means including at least one powered wheel member for moving said apparatus over said ground surface;
   means for providing power to said wheel means;
   means interconnecting said power means and said wheel means to permit said operator to control the movement of said wheel means and to thereby control the movement of said apparatus along said ground surface;
   gate means adapted to selectively extend across said entryway to provide a closure mechanism when said operator is in said apparatus;
   seat assembly means for supporting an operator when in a seated position within said apparatus as well as supporting said operator when in said upright position, said seat assembly means including a seat member and seat control means for selectively moving said seat member between a substantially horizontal position for carrying said operator in said seated position wihtin said apparatus and a substantially vertical position for supporting said operator when said operator is in said upright position within said apparatus; and
   said foot support means having a front portion oriented toward the front of said apparatus and wherein said foot support means is adapted for pivotal movement within a vertical plane to contact said front portion thereof with said ground surface when said seat member is in a horizontal position for carrying the operator in a seated position.

14. The apparatus as claimed in claim 13, wherein said foot support means includes a foot tray portion adjustable in the vertical plane in accordance with the leg length of said operator.

15. In a powered walker apparatus having a frame assembly defining a central space for containing an operator in a standing position, means for selectively moving said apparatus over a ground surface and gate means for closing an entryway into said central space and adapted to define the front surface of said apparatus when in a closed position, the improvement comprising seat assembly means having a seat member movable between a substantially horizontal position within said central space wherein said operator is maintained in a sitting position and a substantially vertical position wherein said operator is maintained in said standing position within such central space, and wherein said seat member is further movable between a first and a second horizontal position, said first horizontal position being defined within said central space, and said second horizontal position projecting substantially forwardly outwardly of said frame assembly to permit said operator ready access to said seat member from the exterior of said powered walker apparatus.

16. The improvement as claimed in claim 15, wherein said seat assembly means includes a single control motor to control the movement of said seat member between said vertical and said horizontal positions.

17. The improvement as claimed in claim 16, wherein said seat control mechanism further includes a latch mechanism to selectively permit movement of said seat member between a first horizontal position within said central space and a second horizontal position projecting substantially outwardly and forwardly of said apparatus, said second horizontal position enabling said operator easy access thereto from outside said apparatus for ingress into and egress from said apparatus.

18. A powered walker apparatus arranged to permit an operator to move between a fully seated position and a fully upright position therewithin, said walker apparatus comprising:
  frame assembly means having a base portion and spaced, vertical side portions to define a space therebetween for receiving an operator's body and to further define an entryway to permit ingress and egress from said space by said operator;
  means connected to said base portion for supporting said frame assembly means above a ground surface for movement therealong, said moving means including at least one powered wheel member for moving said apparatus over said ground surface;
  means for providing power to said moving means;
  means interconnecting said power means and said moving means to permit said operator to control the movement of said moving means and to thereby control the movement of said apparatus along said ground surface;
  gate means adapted to selectively extend across said entryway to provide a closure mechanism when said operator is in said apparatus;
  seat assembly means for supporting an operator when in a seated position within said apparatus as well as supporting said operator when in said upright position, said seat assembly means including a seat member and seat control means for selectively moving said seat member between a substantially horizontal position for carrying said operator in said seated position within said apparatus and a substantially vertical position for supporting said operator when said operator is in said upright position within said apparatus; and
  said seat control means including a seat control arm assembly for moving said seat member between a first rearward horizontal position disposed substantially within the space defined by said vertical side portions and a second forward horizontal position wherein said seat member projects outwardly through said entryway to permit an operator easy access to said seat member exterior to said apparatus for transfer thereto or therefrom, the movement of said seat member from said second to said first horizontal position placing the operator fully within said apparatus.

19. In a powered walker apparatus having a frame assembly defining a central space for containing an operator in a standing position, means for selectively moving said apparatus over a ground surface and gate means for closing an entryway into said central space and adapted to define the front surface of said apparatus when in a closed position, the improvement comprising seat assembly means having a seat member movable between a substantially horizontal position within said central space wherein said operator is maintained in a sitting position and a substantially vertical position wherein said operator is maintained in said standing position within such central space, said seat member being further movable between a first and a second horizontal position, said first horizontal position being defined within said central space, and said second horizontal position projecting forwardly outwardly of said frame assembly to permit said operator ready access to said seat member from the exterior of said powered walker apparatus.

* * * * *